United States Patent
Shigenobu

(10) Patent No.: US 9,277,069 B2
(45) Date of Patent: Mar. 1, 2016

(54) IMAGE FORMING SYSTEM AND IMAGE FORMING APPARATUS TO DISPLAY TOGETHER WITH JOB INFORMATION ABOUT PRINTING JOBS

(71) Applicant: KYOCERA Document Solutions Inc., Osaka (JP)

(72) Inventor: Dai Shigenobu, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/474,085

(22) Filed: Aug. 30, 2014

(65) Prior Publication Data

US 2015/0062640 A1 Mar. 5, 2015

(30) Foreign Application Priority Data

Aug. 30, 2013 (JP) ................................. 2013-179244

(51) Int. Cl.
*G06F 3/12* (2006.01)
*H04N 1/00* (2006.01)
*H04N 1/32* (2006.01)

(52) U.S. Cl.
CPC ....... *H04N 1/00477* (2013.01); *H04N 1/00129* (2013.01); *H04N 1/00244* (2013.01); *H04N 1/00307* (2013.01); *H04N 1/00408* (2013.01); *H04N 1/00954* (2013.01); *H04N 1/32101* (2013.01); *H04N 2201/0075* (2013.01); *H04N 2201/0094* (2013.01)

(58) Field of Classification Search
CPC .......... H04N 1/00477; H04N 1/00307; H04N 1/00129; H04N 1/00244
USPC ......................................................... 358/1.15
See application file for complete search history.

(56) References Cited

U.S. PATENT DOCUMENTS

2014/0063542 A1* 3/2014 Aoki ............................. 358/1.15
2014/0098249 A1* 4/2014 Park ............................ 348/207.2

FOREIGN PATENT DOCUMENTS

| JP | H10-307936 A | 11/1998 |
| JP | 2007-087076 A | 4/2007 |
| JP | 2012-090077 A | 5/2012 |
| JP | 2012-194649 A | 10/2012 |

\* cited by examiner

*Primary Examiner* — Marivelisse Santiago Cordero
*Assistant Examiner* — Kevin Ky
(74) *Attorney, Agent, or Firm* — Hawaii Patent Services; Nathaniel K. Fedde; Kenton N. Fedde

(57) ABSTRACT

To display a real image forming apparatus together with job information about printing jobs accumulated in this image forming apparatus. A mobile terminal acquires an identification number of an image-captured image forming apparatus by image recognition processing of image data. Further, mobile terminal generates a screen layout corresponding to a detection location of image forming apparatus obtained from the image data. Further, mobile terminal transmits, to a server, an inquiry request for address information, including the identification number. Server has address information about each image forming apparatus. When server receives the inquiry request for address information, it identifies image forming apparatus corresponding to the identification number, and transmits an IP address of identified image forming apparatus to mobile terminal. Mobile terminal uses the acquired IP address to acquire job information about printing jobs from image forming apparatus, synthesizing the job information with the image data for display.

7 Claims, 14 Drawing Sheets

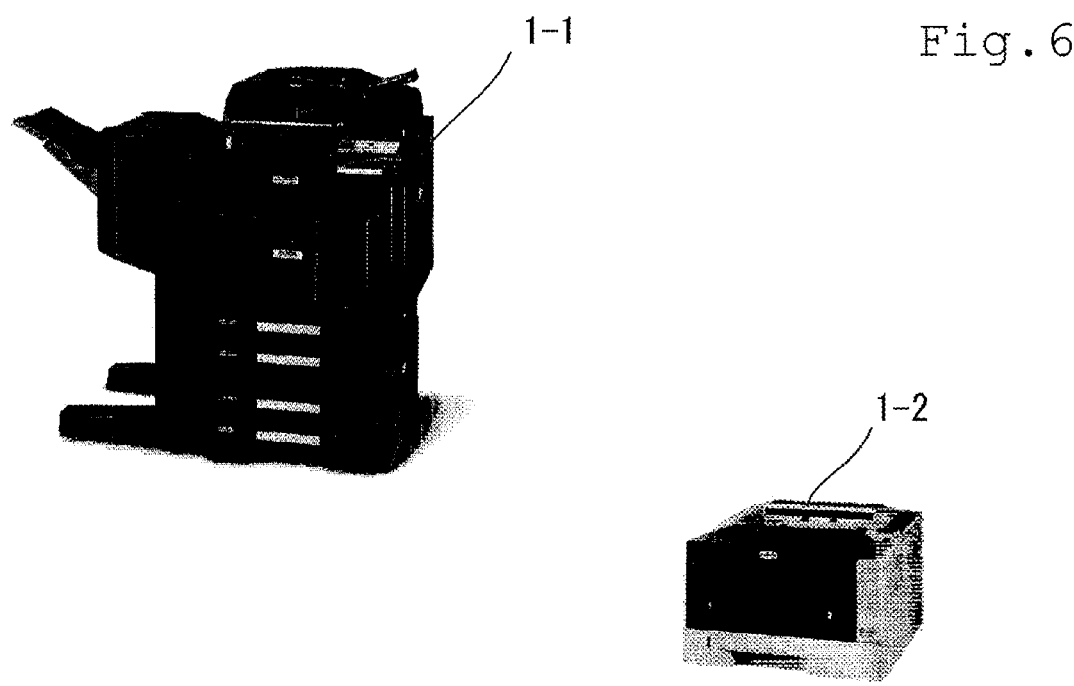
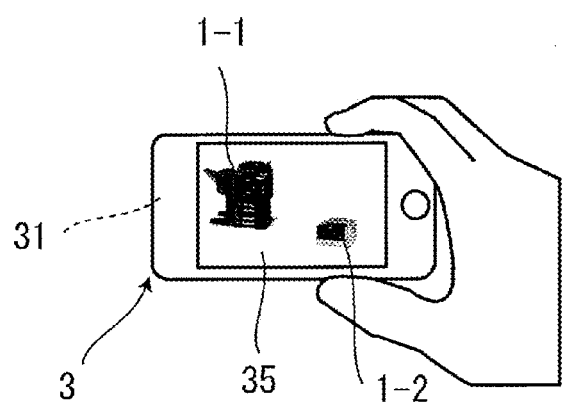
Fig. 6

IMAGE FORMING SYSTEM AND IMAGE FORMING APPARATUS TO DISPLAY TOGETHER WITH JOB INFORMATION ABOUT PRINTING JOBS

INCORPORATION BY REFERENCE

This application is based on and claims the benefit of priority from Japanese Patent Application No. 2013-179244 filed on Aug. 30, 2013, the contents of which are hereby incorporated by reference.

BACKGROUND

The present disclosure relates to an image forming system which includes a mobile terminal, an image forming apparatus, and a server, and an image forming apparatus, and particularly to an image forming system which is capable of confirming a job information about an image forming apparatus, and an image forming apparatus.

With an image forming apparatus, such as a printer, an MFP (Multifunctional Peripheral), or the like, when printing jobs are charged, the printing jobs are normally executed in sequence in the order of having been loaded. The printing jobs which have been loaded are accumulated in a storage part in the inside of the image forming apparatus until the turn of being executed comes. What amount of printing jobs is accumulated in the image forming apparatus can be confirmed by displaying information about the printing jobs which have been accumulated.

Incidentally, there have been proposed various types of techniques for displaying the accumulated data. For example, there has been proposed a technique which arranges the data stored in the storage part on a three-dimensional coordinate space in accordance with the date of preparation and the category, and displays it in the display part.

SUMMARY

An image forming system according to one aspect of the present disclosure includes a mobile terminal, a plurality of image forming apparatuses, and a server. A server storage part provided in the server stores pieces of address information about the plurality of image forming apparatuses. When a photographing part provided in the mobile terminal is used to photograph the image forming apparatus, an inquiry request for the address information about the image-captured image forming apparatus is transmitted from the mobile terminal to the server. In response to the inquiry request for the address information, the server storage part is referenced for identifying the image-captured image forming apparatus. Further, the address information about the identified image forming apparatus is transmitted from the server to the mobile terminal. On the basis of the address information about the identified image forming apparatus that has been transmitted from the server, a request for transmitting a job information is transmitted from the mobile terminal to the identified image forming apparatus. In response to the request for transmitting a job information, a job information about the printing jobs accumulated in the identified image forming apparatus is transmitted from the identified image forming apparatus to the mobile terminal. The job information which has been transmitted from the identified image forming apparatus is synthesized with image data which has been prepared by the photographing part to be displayed in the display part of the mobile terminal.

BRIEF DESCRIPTION OF THE DRAWINGS

FIG. 6 is an image view illustrating how image forming apparatuses are image-captured by the mobile terminal shown in FIG. 1;

DETAILED DESCRIPTION

Image forming systems shown in embodiments 1 to 3 described below implement the AR (Augmented Reality) technology. Specifically, in the image forming system, a mobile terminal is used to photograph an image forming apparatus, and an image-captured video image is displayed in a display part of the mobile terminal. In addition, an address information about the image-captured image forming apparatus is inquired of a server. Further, on the basis of the inquired piece of address information, a job information is acquired from the image forming apparatus. Further, the image forming apparatus and the job information are both displayed on the mobile terminal.

Hereinbelow, with reference to the drawings, the embodiments of the present disclosure will be explained in detail. In the following embodiments, the component exhibiting the same function is provided with the same symbol.

<Embodiment 1<

Figure 1:
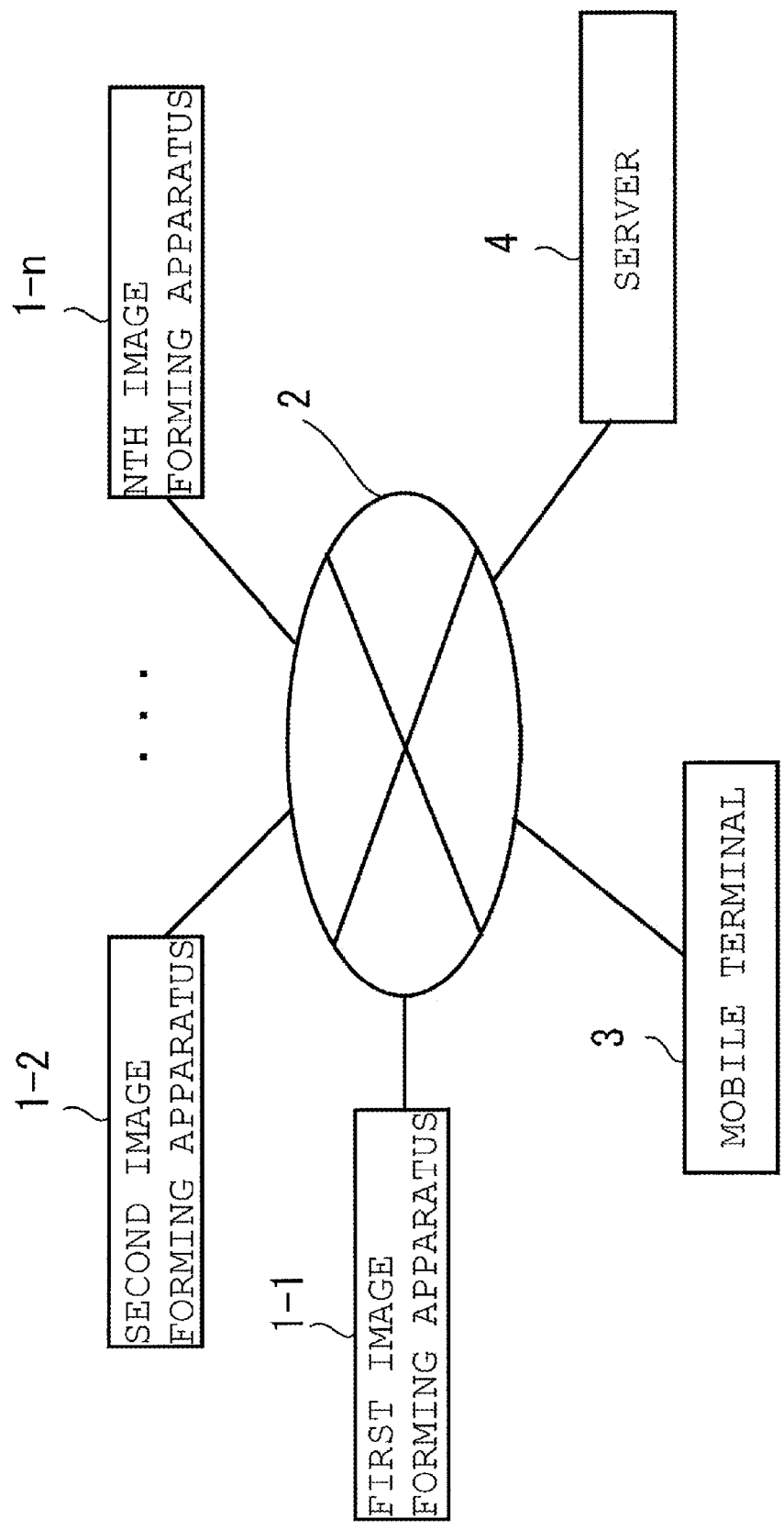
FIG. 1 is a system configuration drawing of an image forming system of an embodiment 1 of the present disclosure.

As shown in FIG. 1, an image forming system 100 includes first to nth image forming apparatuses 1-1 to 1-*n*, a mobile terminal 3, and a server 4. The first to nth image forming apparatuses 1-1 to 1-*n*, the mobile terminal 3, and the server 4 are connected to a network 2. The network 2 may be a wired network, a wireless network, or a network in which a wired and a wireless are mixed. In the drawing, the image forming system 100 includes n (the symbol n denotes a natural number) image forming apparatuses. However, the number of image forming apparatuses may be included one or more in the image forming system 100.

The first to nth image forming apparatuses 1-1 to 1-n are constituted by a printer(s), an MFP(s), and the like, with a mark having an identification number being provided on, for example, the front face. The identification number may be a manufacturing number (a serial number) of the respective first to nth image forming apparatuses 1-1 to 1-n. Further, the identification number may be a number which is unique among the first to nth image forming apparatuses 1-1 to 1-n.

Figure 2:
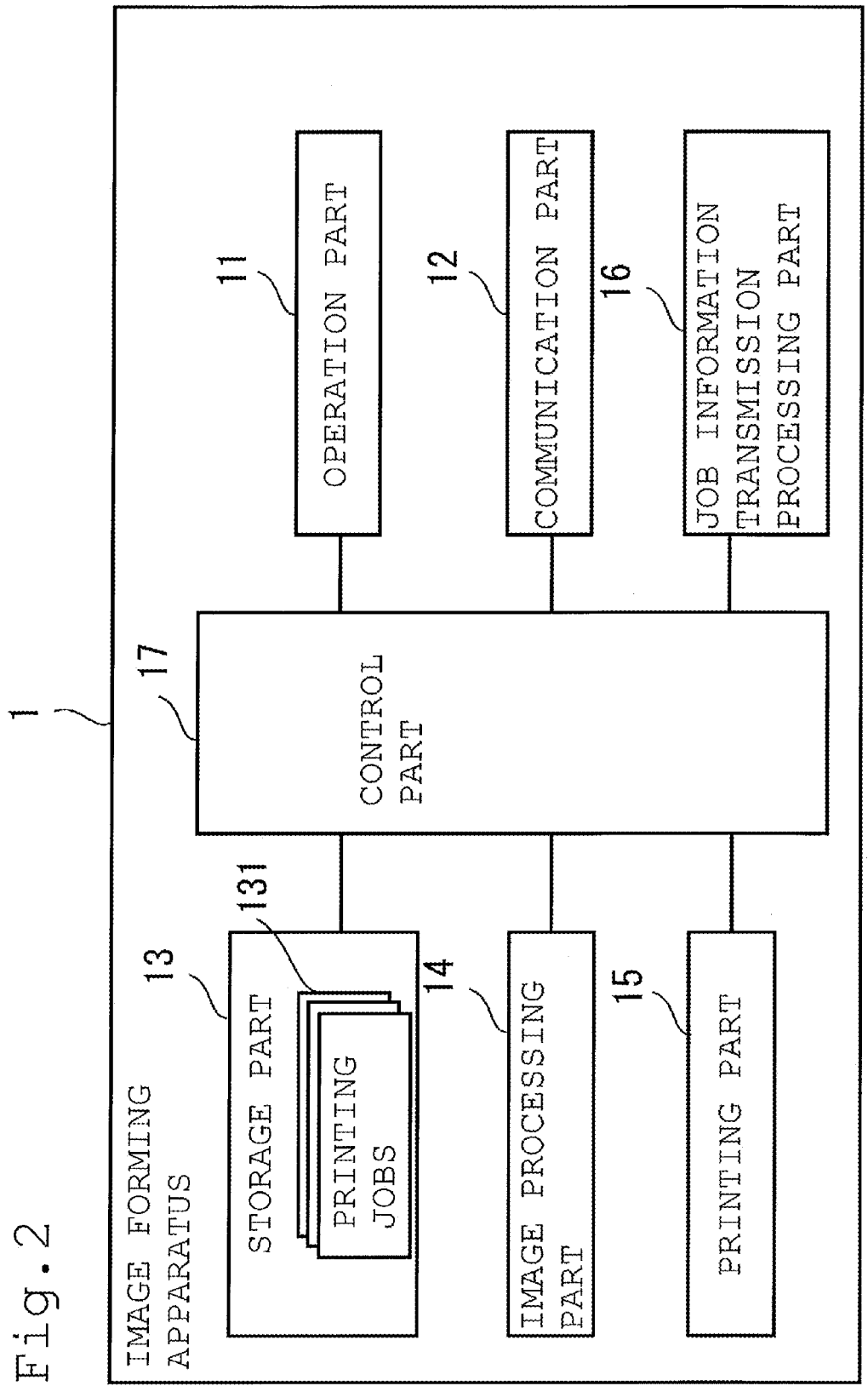
FIG. 2 is a block diagram illustrating a configuration of an image forming apparatus shown in FIG. 1.

A configuration common to the first to nth image forming apparatuses 1-1 to 1-n will be explained with reference to FIG. 2. Hereinbelow, in the case where the first to nth image forming apparatuses 1-1 to 1-n are not distinguished from one another, they will be explained simply as an image forming apparatus 1, respectively.

The image forming apparatus 1 includes an operation part 11, a communication part 12, a storage part 13, an image processing part 14, a printing part 15, a job information transmission processing part 16, and a control part 17.

The operation part 11 includes a display part and an input part. The operation part 11 is a user interface including various operation keys for receiving operations by a user on the image forming apparatus 1.

The communication part 12 has a function to transmit/receive various data to/from the mobile terminal 3 or the server 4 through the network 2.

The storage part 13 is a non-transitory storage medium. The storage part 13 stores image data transmitted from a terminal (not shown) via a communication part 12. Further, the storage part 13 stores image data read by a document reading part (not shown). These image data in the storage part 13 are accumulated as printing job(s).

The image processing part 14 performs prescribed image processing on the image data. The image processing part 14 performs, for example, enlargement/reduction processing, or image improvement processing, such as density adjustment and gradation adjustment.

The printing part 15 prints the image data on the basis of the printing jobs stored in the storage part 13. The printing part 15 forms a latent image on a surface of a photosensitive drum on the basis of the image data read out from, for example, the storage part 13. Further, the printing part 15 performs image formation by using toner to provide a toner image on the basis of the latent image. Further, the printing part 15 causes the toner image to be transferred from the photosensitive drum to a recording sheet. Further, the printing part 15 causes the toner image to be fixed on the recording sheet, which is then discharged.

The job information transmission processing part 16 has a function to respond to a request for transmitting a job information from the mobile terminal 3. On the request for transmitting a job information, the job information transmission processing part 16 transmits a job information about the printing jobs stored in the storage part 13 to the mobile terminal 3 through the communication part 12. The job information includes existence/non-existence of printing job, and a number of printing jobs. Further, in the case of existence of printing job, the job information includes an expected execution termination time for all the printing jobs, and the details of each printing job (for example, the name of a document to be printed, the user name, and the like). In addition, the expected execution termination time for all the printing jobs is calculated in accordance with a number of printing pages for the printing jobs, and the printing processing capacity of the image forming apparatus 1 for executing the printing jobs, and the like.

The control part 17 is connected to the communication part 12, the storage part 13, the image processing part 14, the printing part 15, and the job information transmission processing part 16, respectively. The control part 17 is an information processing part, such as a microcomputer including a non-transitory storage medium. In the storage medium of the control part 17, a control program for performing operation control of the image forming apparatus 1 is stored. The control part 17 reads out the control program stored in the storage medium, and expands and executes it, thereby performing control of the entire apparatus.

In the case where the image forming apparatus 1 is an MFP, in addition to the above-described configuration, there may be provided parts, such as a document reading part comprised of a scanner, and the like, and a facsimile transmission/reception part for transmitting/receiving a facsimile signal via a public line network comprised of a modem, and the like.

Figure 3:
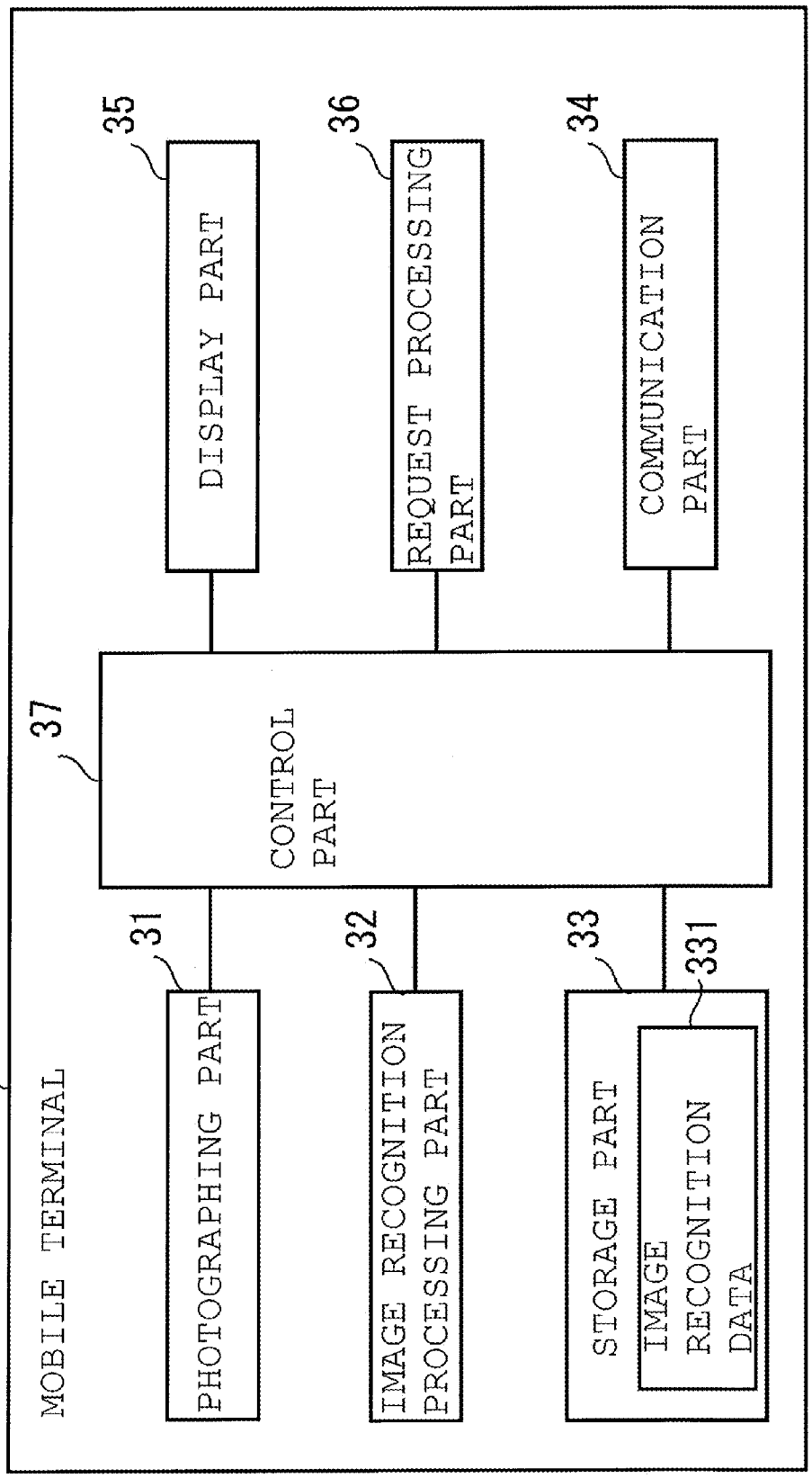
FIG. 3 is a block diagram illustrating a configuration of a mobile terminal shown in FIG. 1.

The mobile terminal 3 is a device equipped with a camera. As shown in FIG. 3, the mobile terminal 3 includes a photographing part 31, an image recognition processing part 32, a storage part 33, a communication part 34, a display part 35, a request processing part 36, and a control part 37.

The photographing part 31 is comprised of a camera, and the like, for taking a picture in a direction of photographing to capture image data. The captured image data is outputted to the display part 35 and the image recognition processing part 32. In the display part 35, the captured image data is displayed as an image-captured video image. Further, the captured image data is subjected to image recognition processing by the image recognition processing part 32.

The image recognition processing part 32 performs image recognition processing for detecting the image forming apparatus 1 from the image data captured by the photographing part 31. In the image recognition processing, the image recognition processing part 32 references an image recognition data 331 stored in the storage part 33 to acquire an apparatus information about the image forming apparatus 1. For example, the image recognition processing part 32 extracts a feature amount for the image data captured by the photographing part 31, and collates this feature amount with the image recognition data 331 stored in the storage part 33, thereby detecting an image of the image forming apparatus 1. Further, for example, the image recognition processing part 32 acquires an apparatus information about the image forming apparatus 1 which corresponds to the detected image. In addition, the image recognition data 331 is data which associates the recognition pattern of the image forming apparatus 1 with the apparatus information (the identification number, the model information, and the like) for the image forming apparatus 1.

An image of the image forming apparatus 1 that is detected from the image data is, for example, a mark provided on the image forming apparatus 1. In this case, the image recognition processing part 32 detects the mark provided on the image forming apparatus 1 to thereby acquire an identification number of the image forming apparatus 1 as an apparatus information about the image forming apparatus 1.

On the basis of a detection location of the image forming apparatus 1 in the image data, the image recognition processing part 32 generates a screen layout representing a display location of the image forming apparatus 1 on a display screen in the display part.

The storage part 33 is a non-transitory storage medium. The storage part 33 stores the image recognition data 331. In the image recognition data 331, the apparatus information (the identification number, the model information, and the like) about the image forming apparatus 1 are associated with the recognition pattern (mark) of the image forming apparatus 1. The pattern (mark) for the image forming apparatus 1 is used for image recognition processing in the image recognition processing part 32.

The communication part 34 has a function to transmit/receive various data to/from the image forming apparatus 1 or the server 4 through the network 2.

The display part 35 has a display function and an input function. The display part 35 displays an image on the basis of the image data which has been acquired from the photographing part 31. Further, the display part 35 acquires a job information about the image forming apparatus 1 through the communication part 34, and uses an OSD (On Screen Display) function for displaying the job information, synthesizing it with the image data in association with the disposition location of the image forming apparatus 1 in the screen layout. The input part of the display part 35 may be constituted by an operation key, and the like, which are separately provided.

The request processing part 36 transmits an inquiry request for an address information to the server 4 in order to acquire an IP address of the image forming apparatus 1 image-captured by the photographing part 31. The inquiry request for an address information includes the identification number which has been acquired by the image recognition processing part 32. It is assumed that the request processing part 36 is previously provided with an IP address of the server 4, thereby being capable of communicating with the server 4.

By the inquiry request for an address information, the request processing part 36 acquires an IP address of the image forming apparatus 1 from the server 4. On the basis of the IP address, the request processing part 36 performs a request for transmitting a job information to the image forming apparatus 1. Thereby, the request processing part 36 acquires a job information from the image forming apparatus 1.

The control part 37 is connected to the photographing part 31, the image recognition processing part 32, the storage part 33, the communication part 34, and the display part 35, respectively. The control part 37 executes operation control of the entire mobile terminal 3 in accordance with a prescribed instruction data inputted from the display part 31. The control part 37 is an information processing part, such as a microcomputer including a non-transitory storage medium. In the storage medium, there is stored a control program for performing operation control of the mobile terminal 3. The control part 37 reads out the control program stored in the storage medium to expand it. Thereby, the control part 37 performs control of the entire apparatus in accordance with a prescribed instruction data inputted from the display part 35.

Figure 4:
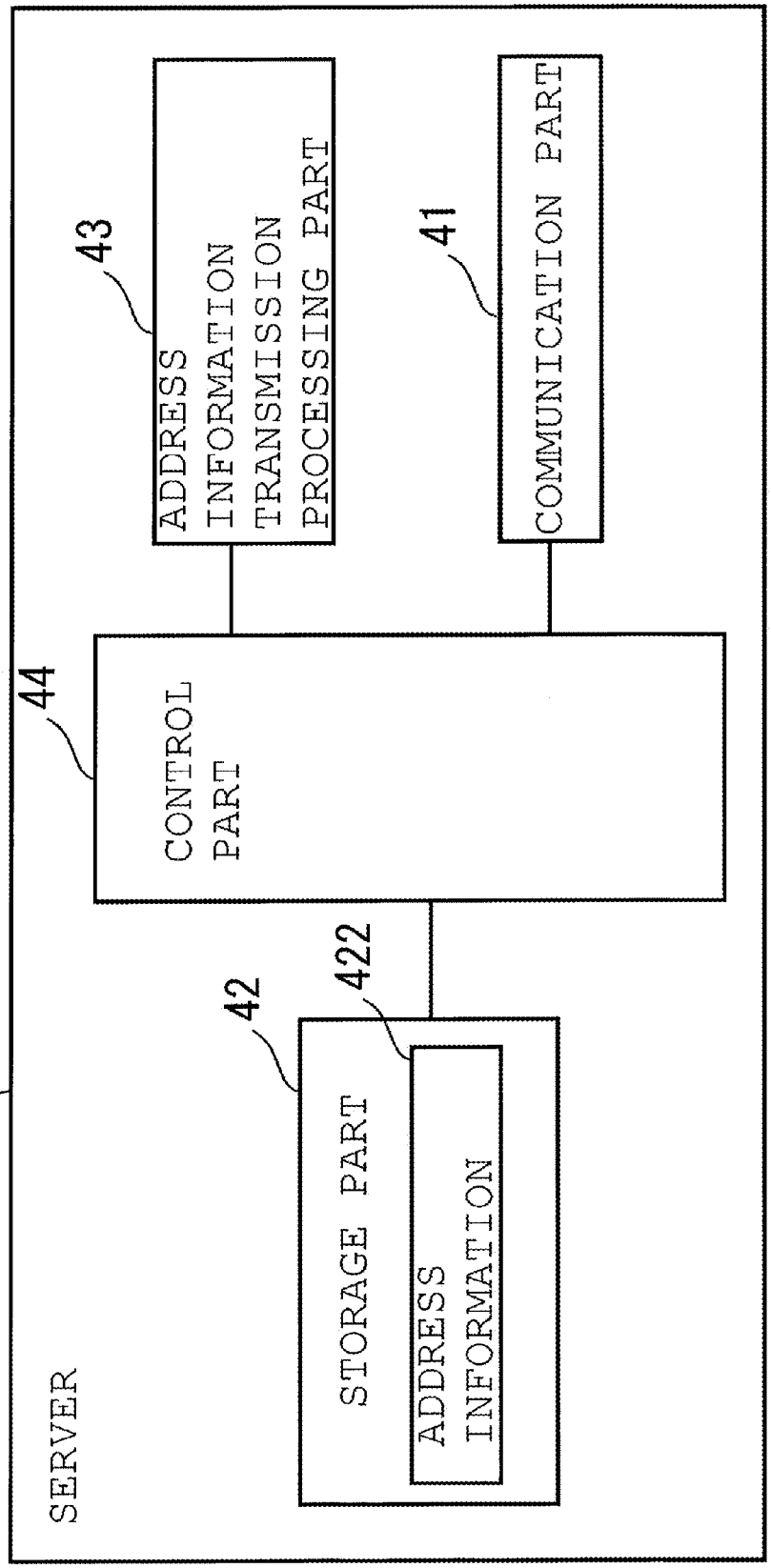
FIG. 4 is a block diagram illustrating a configuration of a server shown in FIG. 1.

The server 4 includes a communication part 41, a storage part 42, an address information transmission processing part 43, and a control part 44, as shown in FIG. 4.

The communication part 41 has a function to transmit/receive various data to/from the image forming apparatus 1 or the server 4 through the network 2.

The storage part 42 is a non-transitory storage medium, storing an address information 422.

The address information 422 is constituted such that the IP addresses of the first to nth image forming apparatuses 1-1 to 1-*n* are associated with the apparatus information (the identification number, the model information, and the like).

The address information transmission processing part 43 receives an inquiry request for an address information from the mobile terminal 3 through the communication part 41. When the address information transmission processing part 43 receives the inquiry request for an address information, references the storage part 42 to identify an image forming apparatus 1 corresponding to the identification number included in the inquiry request for an address information. The address information transmission processing part 43 returns an IP address of the identified image forming apparatus 1 to the mobile terminal 3.

The control part 44 is connected to the communication part 41, the storage part 42, and the address information transmission processing part 43, respectively, executing operation control of the entire server 4. The control part 44 is an information processing part, such as a microcomputer including a non-transitory storage medium. The storage medium stores a control program for performing operation control of the server 4. The control part 44 reads out the control program stored in the storage medium to expand it for performing control of the entire server 4.

Figure 5:
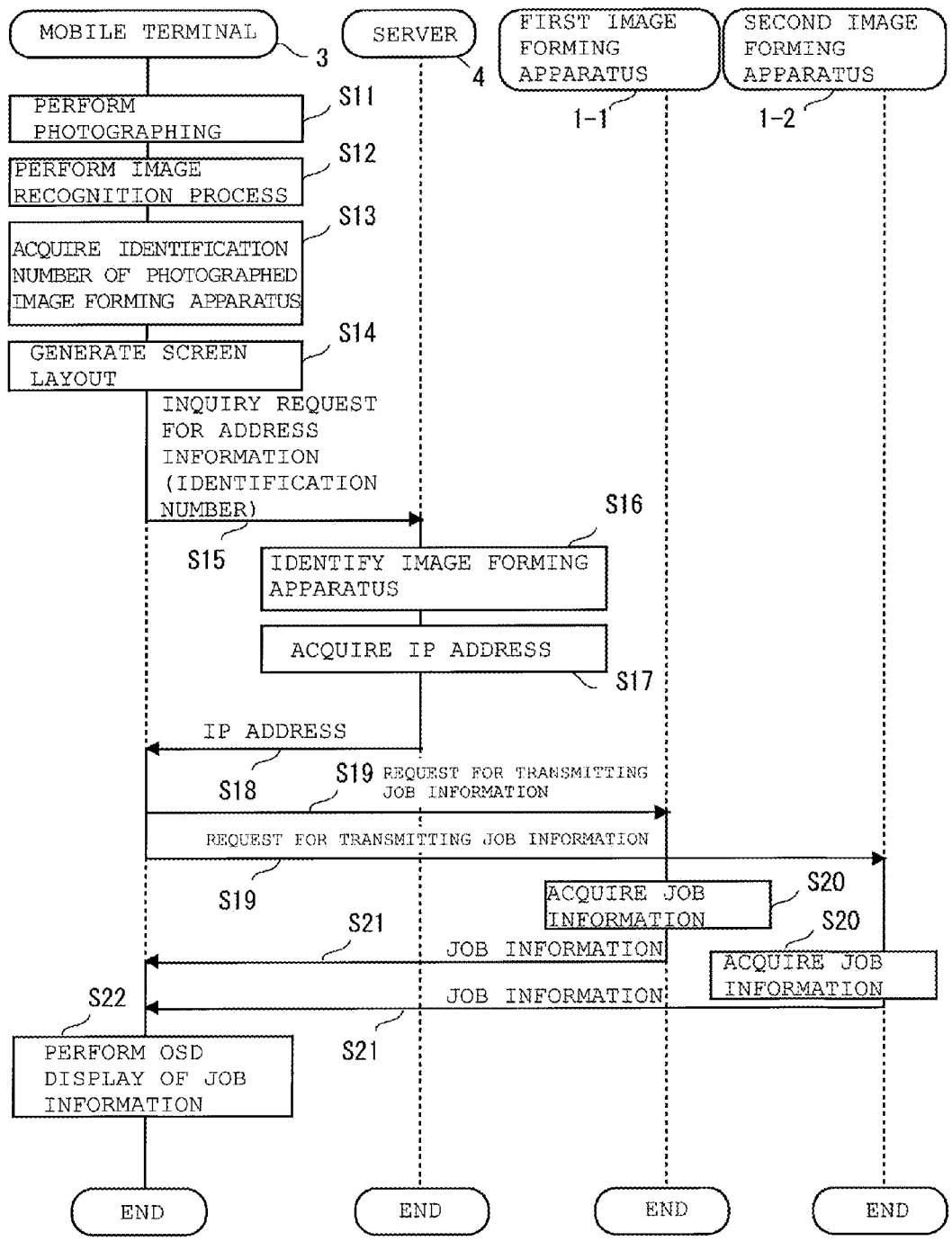
FIG. 5 is a flowchart for the image forming system shown in FIG. 1.

The flow of processing in the image forming system 100 configured as above will be explained with reference to FIG. 5. Here, for explanation, it is assumed that the user photographs the first image forming apparatus 1-1 and the second image forming apparatus 1-2 through the mobile terminal 3.

The photographing part 31 of the mobile terminal 3 photographs the first image forming apparatus 1-1 and the second image forming apparatus 1-2 (Step S11). This generates image data including the first image forming apparatus 1-1 and the second image forming apparatus 1-2. Then, in the display part 35, as shown in FIG. 6, an image is displayed on the basis of the image data captured by the photographing part 31. The user can photograph the first image forming apparatus 1-1 and the second image forming apparatus 1-2 while viewing the display part 35. At this time, the user takes a picture such that the marks provided on the respective first image forming apparatus 1-1 and second image forming apparatus 1-2 appear in the picture.

The image data captured by the photographing part 31 is outputted to the image recognition processing part 32. The image recognition processing part 32 references the storage part 33 for performing image recognition processing (Step S12). On the basis of the mark provided on the first image forming apparatus 1-1 and the mark provided on the second image forming apparatus 1-2, the image recognition processing part 32 detects the first image forming apparatus 1-1 and the second image forming apparatus 1-2 from inside of the image data.

For the first image forming apparatus 1-1 and the second image forming apparatus 1-2 which have been detected by the image recognition processing, the image recognition processing part 32 references the storage part 33. Thereby, the image recognition processing part 32 acquires identification numbers of the first image forming apparatus 1-1 and the second image forming apparatus 1-2 as respective pieces of apparatus information (Step S13).

Further, from the image data, the image recognition processing part 32 generates a screen layout on the basis of the locations where the first image forming apparatus 1-1 and the second image forming apparatus 1-2 have been detected, respectively (Step S14). The screen layout includes the locations where the first image forming apparatus 1-1 and the second image forming apparatus 1-2 are displayed on the display screen, respectively.

Figure 7:
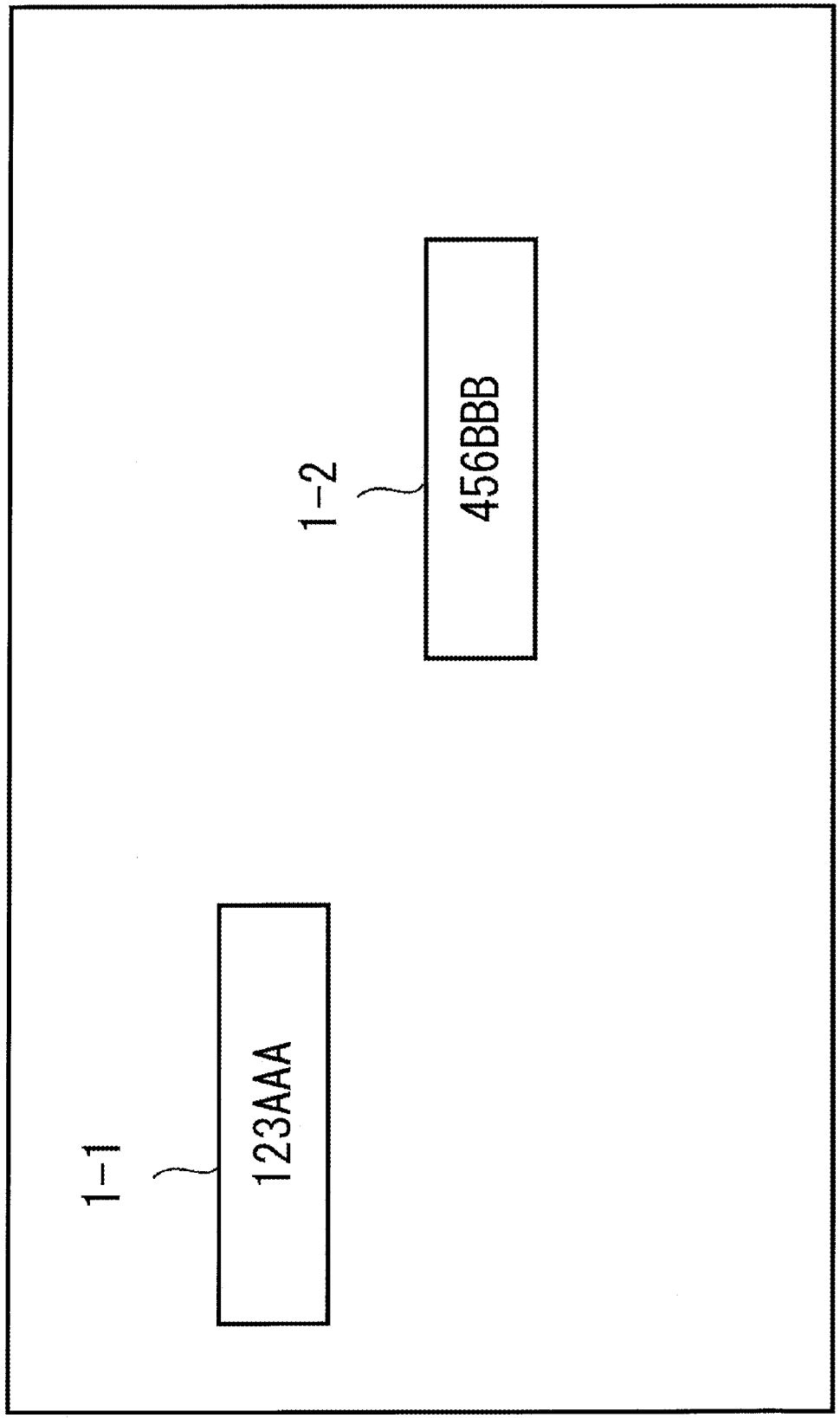
FIG. 7 is an image view of a screen layout which has been generated by an image recognition processing part shown in FIG. 3.

For example, FIG. 7 is an image view of a screen layout showing the locations where the first image forming apparatus 1-1 and the second image forming apparatus 1-2 are displayed on the display screen, respectively. The first image forming apparatus 1-1 and the second image forming apparatus 1-2 are disposed on the screen layout in association with the locations detected from the image data by the image recognition processing part 32. In FIG. 7, in the disposition location on the screen layout for the respective first image forming apparatus 1-1 and second image forming apparatus 1-2, the respective identification numbers "123AAA" and "456BBB" are given for convenience.

Next, about the first image forming apparatus 1-1 and the second image forming apparatus 1-2 which have been image-captured by the photographing part 31, the request processing part 36 transmits an inquiry request for a address information to the server 4 through the communication part 34 (Step S15). Thereby, to the server 4, the respective identification numbers of the first image forming apparatus 1-1 and the second image forming apparatus 1-2 which have been image-captured by the photographing part 31 are transmitted, which is included in the inquiry request for an address information.

The address information transmission processing part 43 of the server 4 receives the inquiry request for an address information from the mobile terminal 3 through the communication part 41. Then, the address information transmission processing part 43 references the storage part 42 to identify an image forming apparatus 1 corresponding to the identification number included in the inquiry request for an address information (Step S16).

Next, the address information transmission processing part 43 references the storage part 42 to acquire an IP address of the respective first image forming apparatus 1-1 and second image forming apparatus 1-2 (Step S17). When the IP address has been acquired, the address information transmission processing part 43 associates the identification number with the IP address of the respective first image forming apparatus 1-1 and second image forming apparatus 1-2. The address information transmission processing part 43 transmits this to the mobile terminal 3 through the communication part 41 (Step S18).

The request processing part 36 of the mobile terminal 3 receives the IP address associated with the identification number of the respective first image forming apparatus 1-1 and second image forming apparatus 1-2 from the server 4 through the communication part 34. On the basis of the received IP address, the request processing part 36 performs a request for transmitting a job information to the first image forming apparatus 1-1 and the second image forming apparatus 1-2 through the communication part 34, respectively (Step S19).

The job information transmission processing part 16 of the first image forming apparatus 1-1 receives the request for transmitting a job information through the communication part 12. Then, on the basis of the printing jobs stored in the storage part 13, the job information transmission processing part 16 acquires a job information (Step S20). Specifically, the first image forming apparatus 1-1 acquires existence/non-existence of printing job, and a number of printing jobs as a job information. Further, in the case of existence of printing job, the first image forming apparatus 1-1 also acquires an expected execution termination time for all the printing jobs, and the details of each printing job as a job information. The details of each printing job are, for example, the name of a document to be printed, the user name, and the like. The expected execution termination time for all the printing jobs is calculated in accordance with a number of printing pages for the printing jobs, and the printing processing capacity of the image forming apparatus 1 for executing the printing jobs, and the like. The job information transmission processing part 16 transmits the acquired job information to the mobile terminal 3 through the communication part 12 (Step S21).

Likewise, the job information transmission processing part 16 of the second image forming apparatus 1-2 receives a request for transmitting a job information through the communication part 12. On the basis of the printing jobs stored in the storage part 13, the job information transmission processing part 16 acquires a job information (Step S20). The job information transmission processing part 16 transmits the acquired job information to the mobile terminal 3 (Step S21).

The display part 35 of the mobile terminal 3 receives a job information from the respective first image forming apparatus 1-1 and second image forming apparatus 1-2 through the communication part 34. On the received pieces of job information, the display part 35 performs OSD processing to display them in the display part 35 (Step S22).

Figure 8:
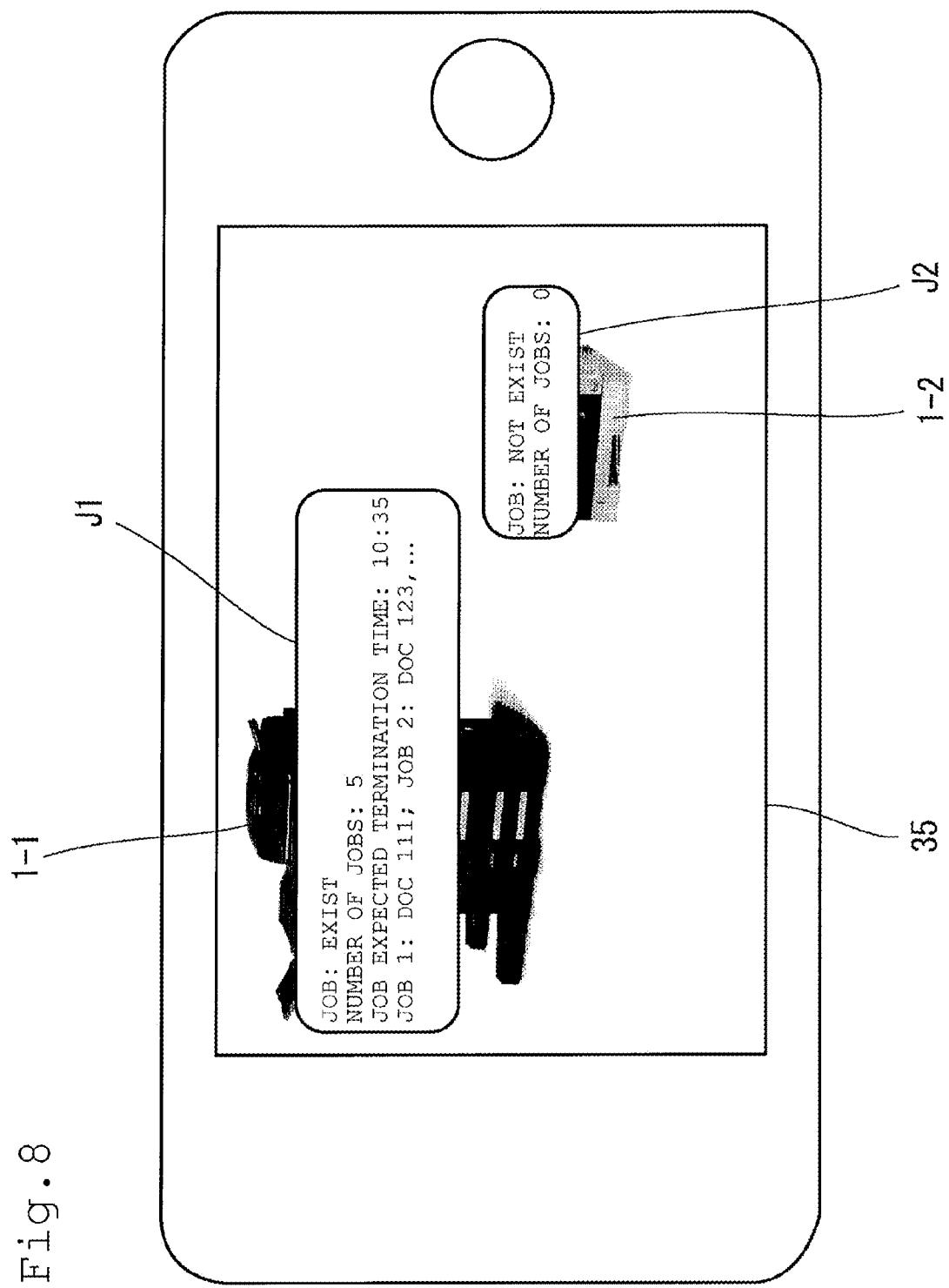
FIG. 8 is an image view illustrating a situation in which the image forming apparatuses which have been image-captured by the mobile terminal shown in FIG. 6 are displayed together with pieces of job information about the image forming apparatuses.

At this time, the display part 35 displays the job information about the respective first image forming apparatus 1-1 and second image forming apparatus 1-2, synthesizing it with the image data in association with the respective disposition location coordinates of the first image forming apparatus 1-1 and second image forming apparatus 1-2 on the screen layout. Therefore, in the display part 35, the job information J1 about the first image forming apparatus 1-1 and the job information J2 about the second image forming apparatus 1-2 are displayed such that they are superposed on the first image forming apparatus 1-1 and the second image forming apparatus 1-2, respectively, as shown in FIG. 8. Thereby, for example, on the basis of the job information J1, such contents as the first image forming apparatus 1-1 having printing jobs; the number of which being five; the expected termination time for the five printing jobs being 10:35; and in detail of the respective printing jobs, Job 1 being Doc 111, Job 2 being Doc 123, . . . , can be grasped. Likewise, on the basis of the job information J2, that the second image forming apparatus 1-2 has no printing job, the number of printing jobs being zero, can be grasped. By the above operations, the present processing is terminated.

While the first image forming apparatus 1-1 and the second image forming apparatus 1-2 are being image-captured by the photographing part 31, the processes from the above-mentioned Step S11 to Step S22 are repetitively executed. In other words, the job information J1, J2 about the respective first image forming apparatus 1-1 and second image forming apparatus 1-2 that is displayed in the display part 35 is updated in real time. In addition, the job information J1, J2 may be displayed in the form of a balloon or a list. Further, the background of the job information J1, J2 may be transparent or translucent.

By the above-described processes, photographing the image forming apparatus 1 with the mobile terminal 3 will provide a superposition display of the image forming apparatus 1 and the job information about the image forming apparatus 1 in the display part 35. Therefore, the user can intuitively grasp the relationship between the image forming apparatus 1 and the printing jobs about the image forming apparatus 1 through the display part 35. Further, the user can immediately confirm what amount of printing jobs is accumulated in the image forming apparatus 1. Further, by photographing a plurality of image forming apparatuses 1 such that they appear in the display part 35, the respective pieces of job information about the plurality of image forming apparatuses 1 can be grasped simultaneously. Further, since, in the display part 35, a real image forming apparatus 1 appears, such a situation as that in which some other user is utilizing the image forming apparatus 1 for copying, or the like, which will not be reflected to the printing job, can be grasped. Therefore, according to the present embodiment, an image forming apparatus 1 with which printing can be made the earliest can be selected, whereby the working efficiency can be improved.

Further, with typical technology, it has been only possible that the relationship between one set of data and another can be displayed in a virtual space, and the relationship between an apparatus in which data is to be saved and the data could not have been intuitively grasped in association with the real space. Especially, it has not been possible to display a real image forming apparatus together with a job information about the printing jobs accumulated in this image forming apparatus.

Contrarily to this, according to the present disclosure, it is possible to provide a technique which allows a real image forming apparatus to be displayed together with a job information about the printing jobs accumulated in this image forming apparatus.

<Embodiment 2>

In the embodiment 1, an example in which, on the basis of a mark provided on the image forming apparatus 1, the image forming apparatus is detected from the image data has been explained. In the embodiment 2, an example in which, on the basis of an appearance figure of the image forming apparatus 1, the image forming apparatus 1 is detected from image data will be explained. Hereinbelow, the points in which the configuration of an image forming system 200 in the embodiment 2 is different from that of the image forming system 100 in the embodiment 1 will be explained.

Figure 9:
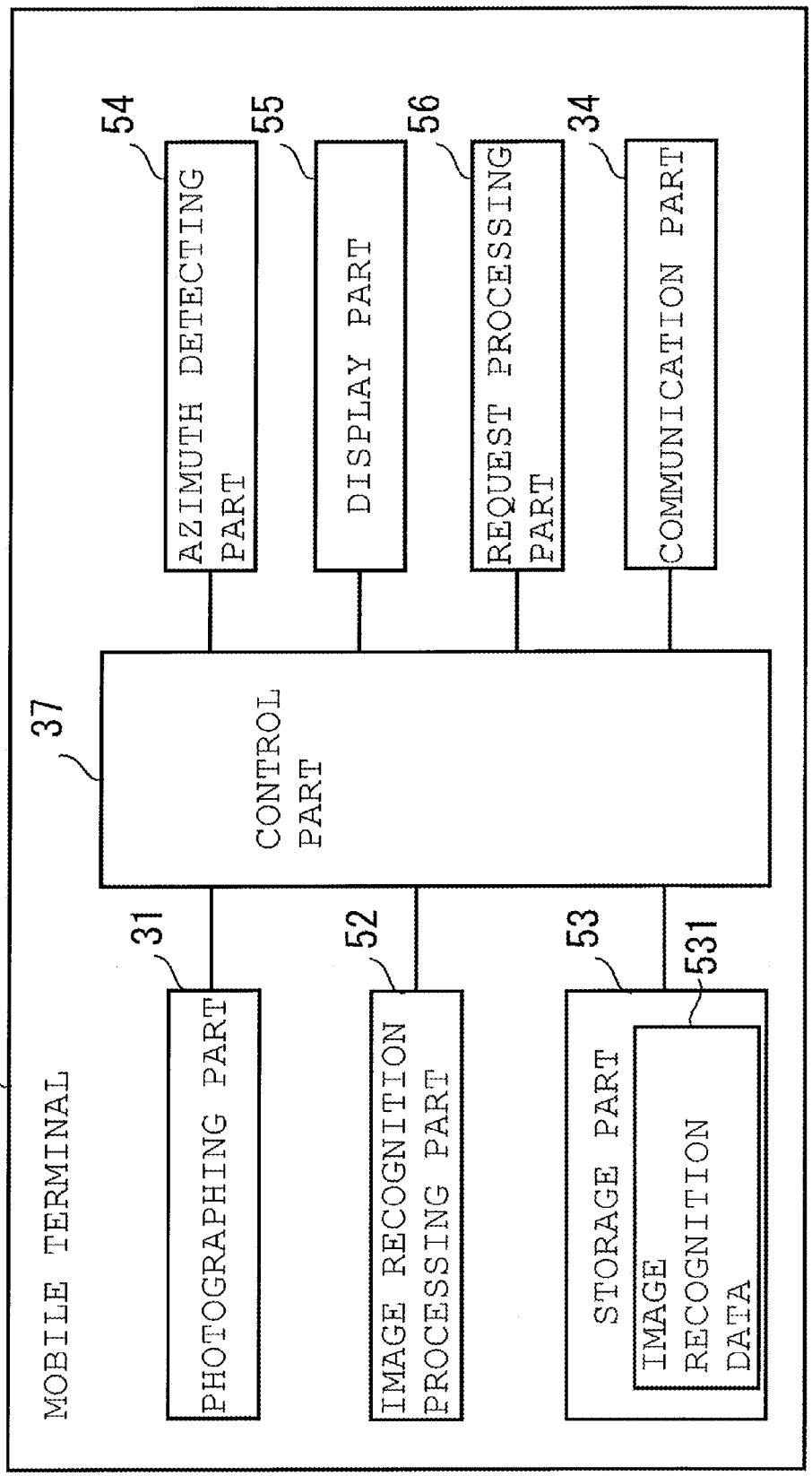
FIG. 9 is a block diagram illustrating a configuration of a mobile terminal in an embodiment 2.

Hereinbelow, with reference to FIG. 9, the points in which the configuration of a mobile terminal 5 in the embodiment 2 is different from that of the mobile terminal 3 in the embodiment 1 will be explained.

In the mobile terminal 5, a storage part 53 for storing image recognition data 531, an image recognition processing part 52, a display part 55, and a request processing part 56 are differ from the storage part 33 for storing the image recognition data 331, the image recognition processing part 32, the display part 35, and the request processing part 36 of the mobile terminal 3 in the embodiment 1, and an azimuth detecting part 54 is newly provided.

The image recognition processing part 52 references the image recognition data 531 stored in the storage part 53 for performing image recognition processing. In the image recognition processing, the image recognition processing part 52 detects an appearance image of the image forming apparatus 1 from image data captured by the photographing part 31. From the detected appearance image, the image recognition processing part 52 acquires a model information as an apparatus information about the image forming apparatus 1. The image forming apparatus 1 is different in appearance design for each model. Further, the image recognition data 531 is constituted such that the pattern of the appearance image of the image forming apparatus 1 is associated with the model information about the image forming apparatus 1. It is assumed that the pattern of the appearance image involves not only a pattern of the front face of the image forming apparatus 1, but also patterns of a plurality of faces, such as the side face and the rear face.

On the basis of the detection location of the image forming apparatus 1 in the image data, the image recognition processing part 52 generates a screen layout representing the display location of the image forming apparatus 1 on the display screen. Then, the image recognition processing part 52 associates the model information about the image forming apparatus 1 that has been acquired by the image recognition processing with the disposition location coordinates for the image forming apparatus 1 in the screen layout.

The azimuth detecting part 54 is comprised of an azimuth sensor, and the like. The azimuth detecting part 54 measures the terrestrial magnetism for acquiring a direction of photographing of the photographing part 31.

The request processing part 56 transmits an inquiry request for an address information to the server 6 in order to acquire an IP address of the image forming apparatus 1 which has been image-captured by the photographing part 31. The inquiry request for an address information in the embodiment 2 includes a model information, a screen layout, and a direction of photographing. Among these, the model information is an information which has been acquired by the image recognition processing part 52. The screen layout is an information which has been generated by the image recognition processing part 52. The direction of photographing is an information about the direction of photographing of the photographing part 31 that has been acquired by the azimuth detecting part 54.

By the inquiry request for an address information, the request processing part 56 acquires an IP address of the image forming apparatus 1 from the server 6. Then, on the basis of the IP address, the request processing part 56 performs a request for transmitting a job information to the image forming apparatus 1. As a result of this, the request processing part 56 acquires a job information from the image forming apparatus 1.

The display part 55 displays the job information about the image forming apparatus 1, synthesizing it with the image data in association with the disposition location coordinates on the screen layout. The display part 55 performs synthesizing and displaying about the screen layout in which the IP address has been associated when transmitted from the server 6.

Figure 10:
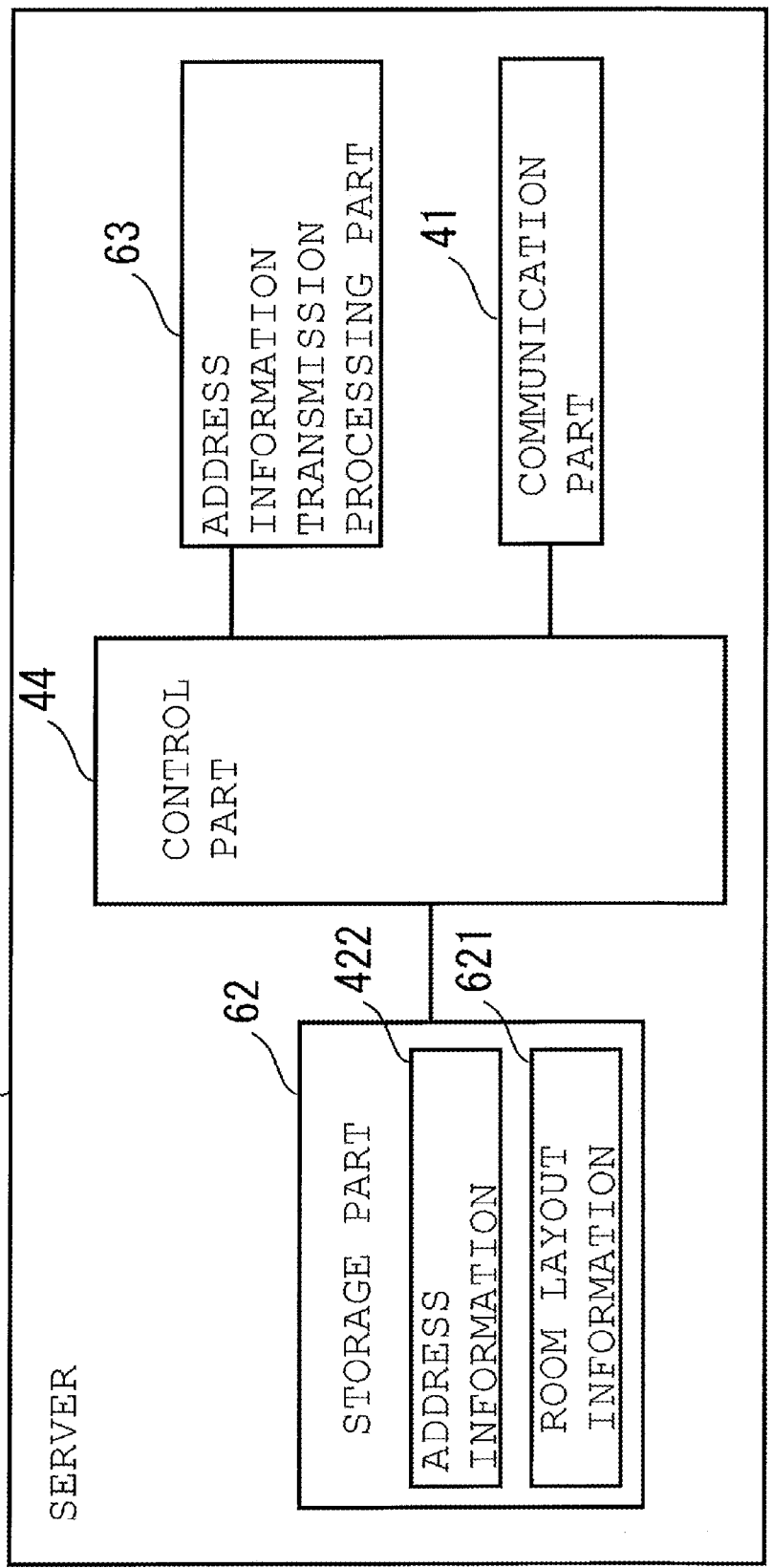
FIG. 10 is a block diagram illustrating a configuration of a server in the embodiment 2.

Next, with reference to FIG. 10, the points in which the configuration of the server 6 in the embodiment 2 is different from that of the server 4 in the embodiment 1 will be explained.

In the server 6, for the address information transmission processing part 43 and the storage part 42 of the server 4 in the embodiment 1, the address information transmission processing part 63 and the storage part 62 are different, respectively.

In the storage part 62, unlike the server 4 in the embodiment 1, a room layout information 621 is stored, being associated with an address information 422. The room layout information 621 is a room layout showing the disposition location and azimuth of the respective first to nth image forming apparatuses 1-1 to 1-*n* in each actual room.

The address information transmission processing part 63 receives an inquiry request for an address information from the mobile terminal 5 through the communication part 41. When the inquiry request for an address information is received, the address information transmission processing part 63 references the storage part 62 to identify which image forming apparatus 1 in the room layout is the image forming apparatus 1 that has been image-captured by the mobile terminal 5. The address information transmission processing part 63 returns an IP address of the identified image forming apparatus 1 to the mobile terminal 5. The specific contents of the processing by the address information transmission processing part 63 will be described later.

Figure 11:
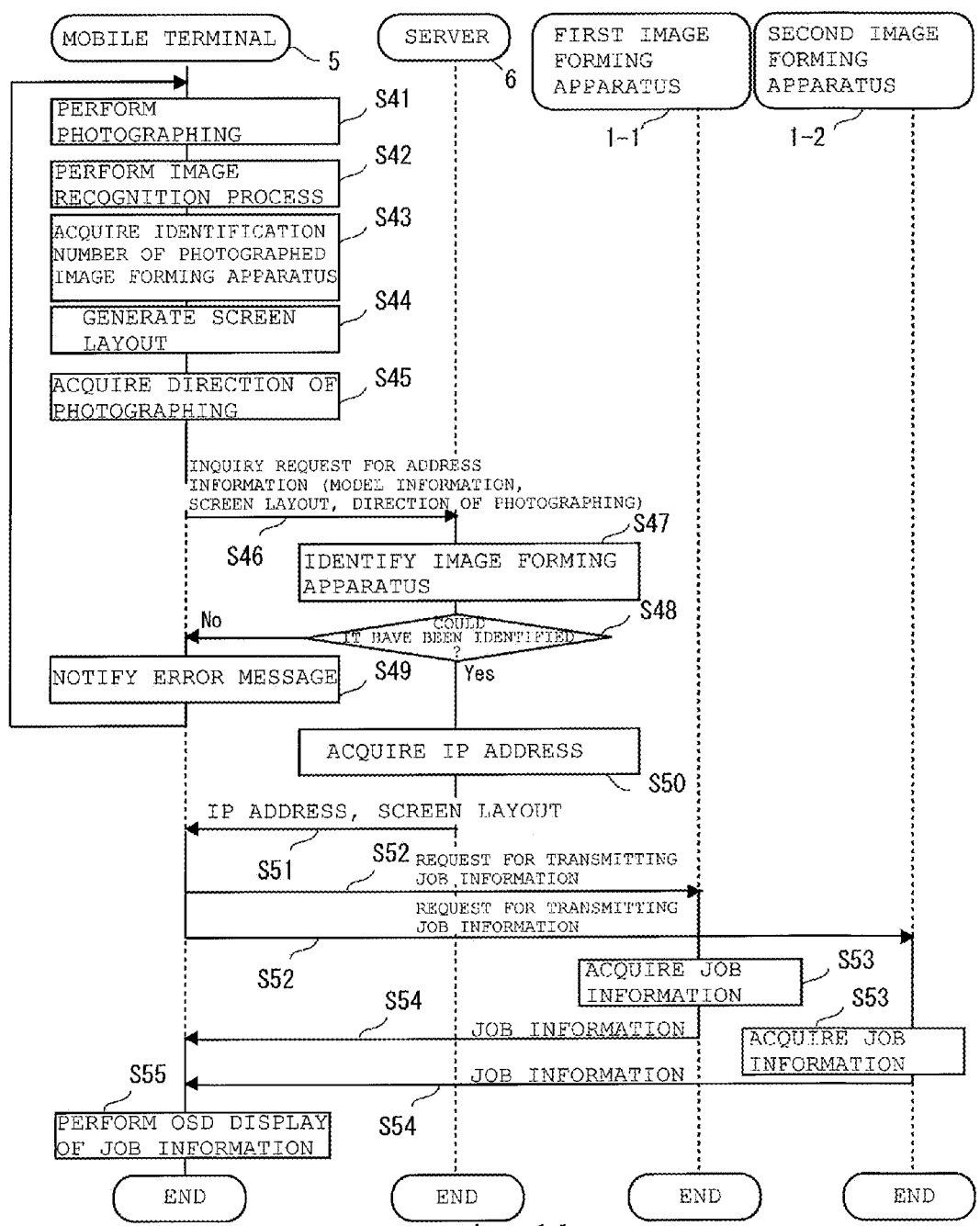
FIG. 11 is a flowchart for an image forming system in the embodiment 2.

The flow of processing in the image forming system 200 as configured above will be explained with reference to FIG. 11. Here, for explanation, it is assumed that the user photographs the first image forming apparatus 1-1 and the second image forming apparatus 1-2 through the mobile terminal 5.

The photographing part 31 of the mobile terminal 5 photographs the first image forming apparatus 1-1 and the second image forming apparatus 1-2 (Step S41). Thereby, image data covering the first image forming apparatus 1-1 and the second image forming apparatus 1-2 is generated. Then, in the display part 55, an image is displayed on the basis of the image data captured by the photographing part 31. The user can photograph the first image forming apparatus 1-1 and the second image forming apparatus 1-2 while viewing the display part 55.

The image data captured by the photographing part 31 is outputted to the image recognition processing part 52. The image recognition processing part 52 references the image recognition data 531 stored in the storage part 53 for performing image recognition processing. In this image recognition processing, the image recognition processing part 52 detects the first image forming apparatus 1-1 and the second image forming apparatus 1-2 from the image data which has been acquired from the photographing part 31 (Step S42).

The image recognition processing part 52 acquires a model information about the respective first image forming apparatus 1-1 and second image forming apparatus 1-2 which have been detected by the image recognition processing (Step S43).

Figure 12:
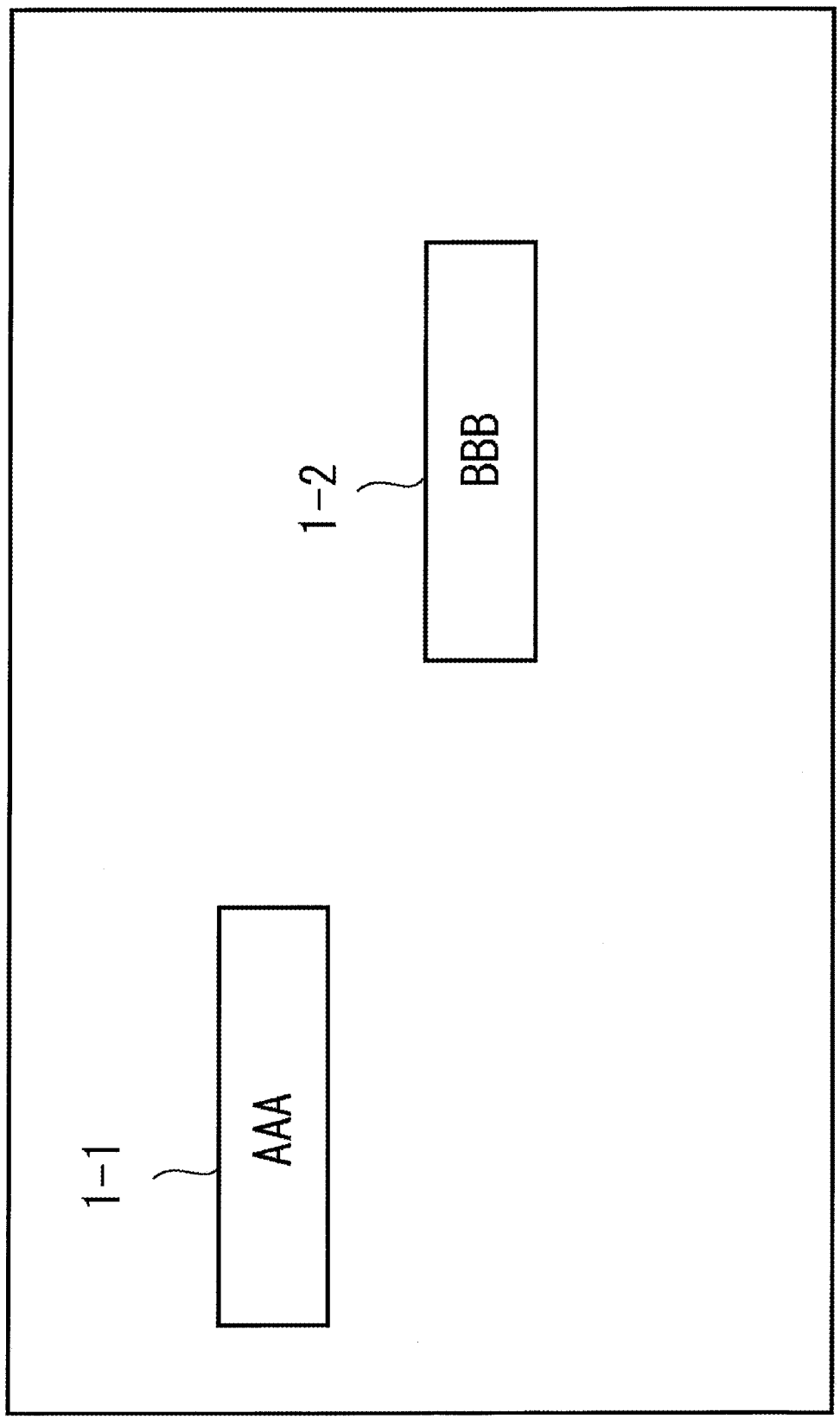
FIG. 12 is an image view of a screen layout which has been generated by an image recognition processing part in the embodiment 2.

Further, from the image data, the image recognition processing part 52 generates a screen layout on the basis of the locations where the first image forming apparatus 1-1 and the second image forming apparatus 1-2 have been detected, respectively (Step S44). The screen layout represents the locations where the first image forming apparatus 1-1 and the second image forming apparatus 1-2 are displayed on the display screen, respectively. As shown in FIG. 12, the model information about the respective first image forming apparatus 1-1 and second image forming apparatus 1-2 which have been detected is associated with the disposition location coordinates on the screen layout for the respective first image forming apparatus 1-1 and second image forming apparatus 1-2. In FIG. 12, in the disposition location on the screen layout for the respective first image forming apparatus 1-1 and second image forming apparatus 1-2, the respective pieces of model information "AAA" and "BBB" are given for convenience.

Next, the azimuth detecting part 54 acquires a direction of photographing of the photographing part 31 (Step S45). For the first image forming apparatus 1-1 and the second image forming apparatus 1-2 which have been image-captured by the photographing part 31, the request processing part 56 transmits an inquiry request for an address information to the server 5 through the communication part 34 (Step S46). Thereby, the model information about the image forming apparatus 1, the screen layout, and the direction of photographing are transmitted to the server 6, being included in the inquiry request for an address information. Among these, the model information is a model information about the respective first image forming apparatus 1-1 and second image forming apparatus 1-2 which have been image-captured by the photographing part 31. Further, the screen layout shows the disposition location of the respective first image forming apparatus 1-1 and second image forming apparatus 1-2. Further, the direction of photographing indicates the direction of photographing of the photographing part 31.

The address information transmission processing part 43 of the server 6 receives the inquiry request for an address information from the mobile terminal 5 through the communication part 41. On the basis of this inquiry request, the address information transmission processing part 63 identifies which image forming apparatus 1 which has been image-captured by the mobile terminal 5 is the image forming apparatus 1 within the room layout (Step S47). Specifically, when the address information transmission processing part 63 receives the inquiry request for an address information, it acquires the model information, the screen layout, and the direction of photographing about the image forming apparatus 1; and they are included in the inquiry request for an address information. Next, the address information transmission processing part 63 references the storage part 62 to identify an image forming apparatus 1 in the room layout that has a model information which matches to the model information in the inquiry request for an address information. Of the identified image forming apparatuses 1, the address information transmission processing part 63 identifies an image forming apparatus 1 which is located in an azimuth matching to the direction of photographing, and which is located within the range of photographing of the photographing part 31, when the image forming apparatus 1 is viewed from inside of the room. Further, the address information transmission processing part 63 identifies an image forming apparatus 1 for which the disposition location of the image forming apparatus 1 in the room layout corresponds to the disposition location of the image forming apparatus 1 in the screen layout.

For example, it is assumed that, from the mobile terminal 5, as an inquiry request for an address information, there has been transmitted the direction of photographing of "north", the screen layout in which the first image forming apparatus 1-1 and the second image forming apparatus 1-2 are disposed (see FIG. 12), and the apparatus information of model AAA and model BBB.

Figure 13:
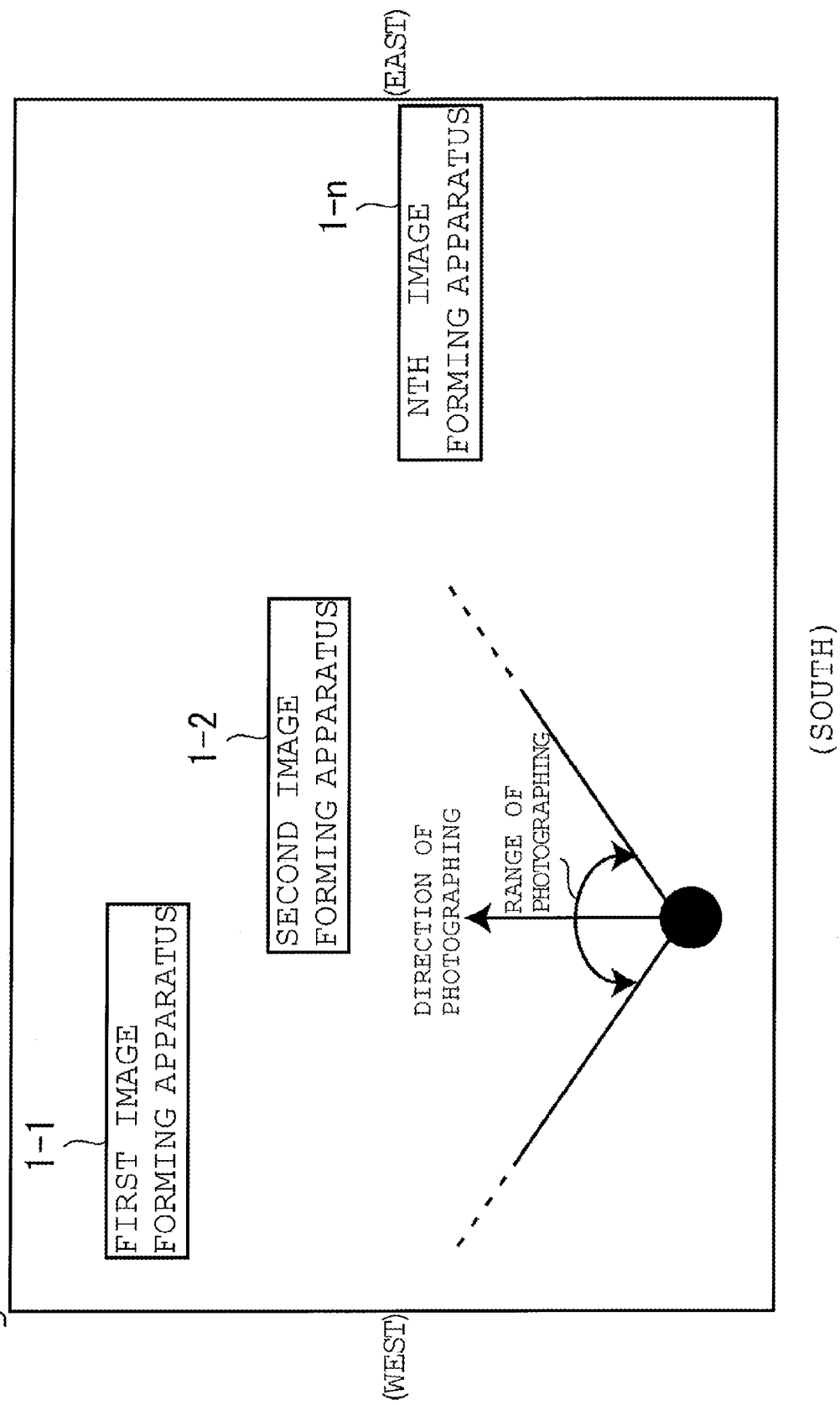
FIG. 13 is an image view for a room layout information stored by the server in the embodiment 2.

It is further assumed that, in the room layout of the room layout information 621, as shown in, for example, FIG. 13, the first image forming apparatus 1-1, the second image forming apparatus 1-2, and the nth image forming apparatus 1-n are disposed in the room, being associated with the azimuths. In the room layout, the model of the first image forming apparatus 1-1 is AAA, the model of the second image forming apparatus 1-2 is BBB, and the model of the nth image forming apparatus 1-n is NNN.

Here, the image forming apparatuses in the room layout that have a model information which matches to the model information in the inquiry request for an address information are the first image forming apparatus 1-1 and the second image forming apparatus 1-2. When viewed from inside of the room in the room layout, the first image forming apparatus 1-1 and the second image forming apparatus 1-2 are located in the azimuth matching to the direction of photographing, and are located within the range of photographing. At this time, the disposition locations of the first image forming apparatus 1-1 and the second image forming apparatus 1-2 in the room layout correspond to the disposition locations of the first image forming apparatus 1-1 and the second image forming apparatus 1-2 in the screen layout, respectively. In other words, in the screen layout, on the obliquely forward side of the first image forming apparatus 1-1, the second image forming apparatus 1-2 is disposed, while, also in the room layout, on the obliquely forward side of the first image forming apparatus 1-1, the second image forming apparatus 1-2 is disposed.

Thus, the address information transmission processing part 63 identifies, from among the image forming apparatuses 1 in the room layout that have a model information which matches to the model information in the inquiry request for a address information, the first image forming apparatus 1-1 and the second image forming apparatus 1-2 as the image forming apparatus 1 which, when the image forming apparatus 1 is viewed from inside of the room, is located in the azimuth matching to the direction of photographing, and is located within the range of photographing of the photographing part 31, and with which the disposition location of the image forming apparatus 1 in the room layout corresponds to the disposition location of the image forming apparatus 1 in the screen layout. Accordingly, even if an inquiry request for an address information includes a plurality of image forming apparatuses 1 of the same model, the address information transmission processing part 63 can identify from among the image forming apparatuses 1. In other words, on the basis of the disposition relationship among the image forming apparatuses 1 in the screen layout, the address information transmission processing part 63 can identify an image forming apparatus 1 which has been image-captured by the photographing part 31 from among the image forming apparatuses 1 in the room layout information 621.

Figure 14:
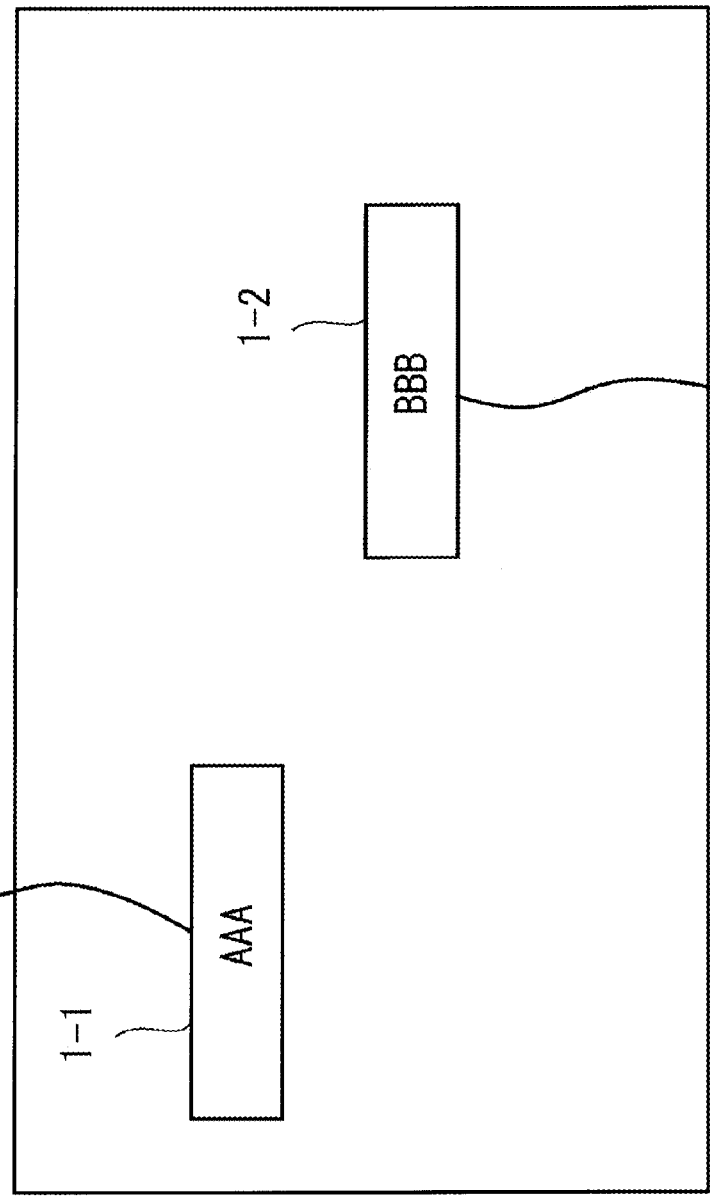
FIG. 14 is an image view of a situation in which an address information transmission processing part in the embodiment 2 has replied IP addresses to the mobile terminal.

The address information transmission processing part 63 identifies the image forming apparatus 1 (YES in Step S48). In this case, the address information transmission processing part 63 references the storage part 62 to acquire an IP address of the respective identified first image forming apparatus 1-1 and second image forming apparatus 1-2 (Step S50). When the IP address has been acquired, the address information transmission processing part 63 associates the IP address of the respective first image forming apparatus 1-1 and second image forming apparatus 1-2 with the disposition location coordinates. The disposition location coordinates are coordinates of the respective first image forming apparatus 1-1 and second image forming apparatus 1-2 in the screen layout which has been acquired from the mobile terminal 5. Then, the address information transmission processing part 63 transmits the disposition location coordinates and the IP address which has been associated therewith to the mobile terminal 5 through the communication part 41 (Step S51). Thereby, as shown in FIG. 14, the disposition location coordinates of the respective first image forming apparatus 1-1 and second image forming apparatus 1-2 in the screen layout are transmitted to the mobile terminal 5, being associated with the respective IP addresses. Accordingly, the mobile terminal 5 can distinguish to which image forming apparatus 1 in the screen layout the IP address having been transmitted from the address information transmission processing part 63 corresponds. In other words, since that which is performed is more than simply associating the IP address with the model information, a plurality of image forming apparatuses 1 which have been image-captured can be distinguished from one another, even if they are of the same model.

The request processing part 56 of the mobile terminal 5 receives the IP address of the respective first image forming apparatus 1-1 and second image forming apparatus 1-2 from the server 6 through the communication part 34. The received IP address is associated with the disposition location coordinates of the respective first image forming apparatus 1-1 and second image forming apparatus 1-2 in the screen layout. Further, on the basis of the received IP address, the request processing part 56 performs a request for transmitting a job information to the respective first image forming apparatus 1-1 and second image forming apparatus 1-2 through the communication part 34 (Step S52).

The job information transmission processing part 16 of the first image forming apparatus 1-1 receives the request for transmitting a job information through the communication part 12. Then, the job information transmission processing part 16 of the first image forming apparatus 1-1 acquires a job information on the basis of the printing jobs stored in the storage part 13 (Step S53). The job information transmission processing part 16 transmits the acquired job information to the mobile terminal 5 through the communication part 12 (Step S54).

Likewise, the job information transmission processing part 16 of the second image forming apparatus 1-2 receives the request for transmitting a job information through the communication part 12. The job information transmission processing part 16 of the second image forming apparatus 1-2 acquires a job information on the basis of the printing jobs stored in the storage part 13 (Step S53), and transmits the job information to the mobile terminal 5 (Step S54).

The display part 55 of the mobile terminal 5 receives the job information from the respective first image forming apparatus 1-1 and second image forming apparatus 1-2 through the communication part 34. The display part 55 performs OSD processing on the respective pieces of job information to display them (Step S55).

At this time, the display part 55 displays the job information about the respective first image forming apparatus 1-1 and second image forming apparatus 1-2, synthesizing it with the image data. In doing this, the display part 55 performs synthesis with the image data in association with the disposition location coordinates of the respective first image forming apparatus 1-1 and second image forming apparatus 1-2 on the screen layout with which the IP address of the respective first image forming apparatus 1-1 and second image forming apparatus 1-2 have been associated. Thereby, in the display part 55, the job information about the first image forming apparatus 1-1 and the job information about the second image forming apparatus 1-2 are displayed such that they are superposed on the first image forming apparatus 1-1 and the second image forming apparatus 1-2, respectively. While the first image forming apparatus 1-1 and the second image forming apparatus 1-2 are being image-captured by the photographing part 31, the processes from the above-mentioned Step S41 to Step S55 are repetitively executed.

There may be a case where, among the image forming apparatuses 1 in the room layout, there are a plurality of image forming apparatuses 1 which have a model information matching to the model information in the inquiry request for an address information, and any one of these is located in an azimuth matching to the direction of photographing, and is located within the range of photographing. In this case, there is the possibility that the address information transmission processing part 63 may not be able to identify which image forming apparatus 1 in the room layout is the image forming apparatus 1, which has been image-captured by the mobile terminal 5.

In the case where the image forming apparatus 1 could not have been identified (NO in Step S48), the address information transmission processing part 63 notifies the mobile terminal 5 of that the image forming apparatus 1 could not have been identified, and notifies an error message to the mobile terminal 5 (Step S49). In doing so, the address information transmission processing part 63 may notify the mobile terminal 5 of a message for prompting of changing the photographing object in order to identify the image-captured image forming apparatus 1. For example, the address information transmission processing part 63 may notify the mobile terminal 5 of a message for prompting of photographing some other image forming apparatus 1 having a different model information together with the image forming apparatus 1 which could not have been identified. Alternatively, the address information transmission processing part 63 may notify the mobile terminal 5 of a message for prompting of collectively photographing all the image forming apparatuses having the same model information. In response to the error message, the user may again perform photographing (Step S41).

<Embodiment 3>

In the above-described embodiments 1 and 2, by performing image recognition processing on the image data, an apparatus information about the image-captured image forming apparatus 1 has been acquired to inquire of the server about an address information. However, an appropriate method other than this may be used to inquire of the server about an address information about the image-captured image forming apparatus 1. For example, by a method which will be explained below, the mobile terminal may inquire of the server about an address information about the image-captured image forming apparatus 1. Hereinbelow, an image forming system 300 which is constituted by a mobile terminal 6, a plurality of image forming apparatuses 7, and a server 8 will be used as an example for explanation.

The mobile terminal 6, the image forming apparatuses 7, and the server 8 are wirelessly connected to one another through an access point. While the image forming apparatuses 7 which have been image-captured by the photographing part 31 are being appearing on the display part 35, the user operates an operation key provided on the mobile terminal 6. Operation of this operation key is performed to display the job information about the image-captured image forming apparatuses 7. Upon receiving the operation of the operation key, the mobile terminal 6 transmits an electric field intensity measuring request to the access point. The access point broadcasts the electric field intensity measuring request to the image forming apparatuses 7. In response to the electric field intensity measuring request, the image forming apparatuses 7 broadcast a measurement signal. An apparatus for broadcasting a measurement signal may be provided in the room. On the basis of the measurement signal of the image forming apparatuses 7, the mobile terminal 6 measures the reception electric field intensity of a radio wave which has been transmitted from each image forming apparatus 7. Further, the mobile terminal 6 acquires a direction of photographing through the azimuth detecting part 54. For the image-captured image forming apparatuses 7, the mobile terminal 6 transmits an inquiry request for an address information including the reception electric field intensity measured at the photographing point and the direction of photographing by the azimuth detecting part 54 to the server 8 via the access point.

In a storage part 82 of the server 8, an address information 422 is stored, being associated with a room layout information 821 which associates the actual disposition locations and the azimuths of the image forming apparatuses 7 in each room with one another. In this room layout information 821, the electric field intensity of the radio wave transmitted by each image forming apparatus 7 installed in the room is further indicated. This electric field intensity is that which has been previously measured at each point in the room. The server 8 receives the reception electric field intensity at the photographing point and the direction of photographing from the mobile terminal 6. Then, the server 8 references the storage part 62 to identify a location in the room layout corresponding to the reception electric field intensity at the photographing point. Next, the server 8 identifies a particular image forming apparatus 7 which, when an azimuth in the room layout corresponding to the direction of photographing is viewed from the identified location in the room layout, is located in a direction of that azimuth. Next, for the identified image forming apparatus 7, on the basis of the disposition location in the room layout, the server 8 generates a screen layout at the time when the image forming apparatus 7 is displayed in the mobile terminal 6. Then, the server 8 references the address information 422 to acquire an IP address of the identified image forming apparatus 7. The server 8 associates the IP address with the disposition location coordinates of the image forming apparatus 7 on the generated screen layout to transmit it to the mobile terminal 6.

On the basis of the IP address which has been acquired from the server 8, the mobile terminal 6 transmits a request for transmitting a job information to the image forming apparatus 7. The mobile terminal 6 displays the job information which, on the request for transmitting a job information, has been acquired from the image forming apparatus 7, synthesizing it with the disposition location coordinates on the screen layout with which the IP address has been associated. Thereby, by photographing the image forming apparatus 7, the mobile terminal 6 can provide a superposition display of the image forming apparatus 7 and the job information about the image forming apparatus 7.

The present disclosure is not limited to the above-described embodiments, and of course it is possible to alter them as appropriate within the scope of the gist of the present disclosure.

For example, more than one of the above-described embodiments 1 to 3 may be combined with one another. For example, the embodiment 1 and the embodiment 2 may be combined with each other. In this case, if, on the basis of the mark provided on the image forming apparatus, the identification number of the image forming apparatus has been acquired, the processing of the embodiment 1 is executed. Further, if the mark provided on the image forming apparatus has not been detected, and, on the basis of the appearance image of the image forming apparatus, the model information about the image forming apparatus has been acquired, the processing of the embodiment 2 may be executed.

What is claimed is:

1. An image forming system comprising a mobile terminal, a plurality of image forming apparatuses that is image-captured by a photographing part provided in said mobile terminal, and a server, wherein
 in a server storage part provided in said server, address information about said plurality of image forming apparatuses being stored,
 when said plurality of image forming apparatuses is image-captured by the photographing part provided in said mobile terminal, an inquiry request for address information about an image-captured image forming apparatus of said plurality being transmitted from said mobile terminal to said server, wherein said inquiry request for address information includes:
  a) model information about said image forming apparatus, wherein the model information has been acquired by an image recognition processing part provided in said mobile terminal on the basis of an appearance image of said image forming apparatus in image data which has been image captured by said photographing part,
  b) a screen layout representing disposition locations of respective image forming apparatuses of said plurality of image forming apparatuses on a display screen on the basis of detected locations of said plurality of image forming apparatus, wherein the detected location have been detected by said image recognition processing part from said image data, and
  c) an image-capturing direction for said photographing part, wherein the direction has been detected by an azimuth detection part provided in said mobile terminal,
 said address information stored in the server storage part of said server being associated with:

a) room layout information that corresponds disposition locations of said plurality of image forming apparatuses to azimuths in each actual room, and
b) the model information about the image forming apparatuses, which is in the room layout information, and being stored, to respond to said inquiry request for address information, said server storage part being referenced and the image-captured image forming apparatus being identified, and, from said server, address information about said identified image forming apparatus being transmitted to said mobile terminal, wherein the image-captured image forming apparatus:
a) is among image forming apparatuses in a room layout that have model information matching to said model information in said inquiry request for address information,
b) when said image forming apparatuses are viewed from inside of a room, is located in an azimuth matching to said direction of image-capturing, and
c) is located within an image-capturing range of the photographing part, wherein the disposition location of said image forming apparatus in the room layout corresponds to the disposition location of said image forming apparatus in said screen layout, and address information about said identified image forming apparatus being transmitted to said mobile terminal, on the basis of said address information, which is transmitted from said server and is about said identified image forming apparatus, a request for transmitting job information being transmitted from said mobile terminal to said identified image forming apparatus, and to respond to said request for transmitting job information, job information about printing jobs accumulated in said identified image forming apparatus being transmitted from said identified image forming apparatus to said mobile terminal, and the job information transmitted from said identified image forming apparatus being synthesized with image data image-captured by said photographing part and being displayed in a display part of said mobile terminal, wherein, on the basis of disposition relationship among the plurality of image forming apparatuses in the screen layout, said server identifies said image forming apparatus for which the inquiry request was transmitted by identifying an image forming apparatus for which its disposition location in the room layout corresponds to the disposition location, in the screen layout, of the image forming apparatus for which the inquiry request was transmitted.

2. The image forming system according to claim 1, wherein said inquiry request for address information includes an identification number of said image forming apparatus on the basis of a mark provided on said image forming apparatus in the image data which has been prepared by said photographing part, in the server storage part provided in said server, the address information about said plurality of image forming apparatuses and identification numbers thereof being associated with one another and being stored, to respond to said inquiry request for address information, said server storage part being referenced and being identified an image forming apparatus corresponding to said identification number, and address information about said identified image forming apparatus being transmitted to said mobile terminal.

3. The image forming system according to claim 1, wherein said address information stored in the server storage part of said server being associated room layout information, which shows disposition locations and azimuths of said plurality of image forming apparatus are corresponded to an electric field intensity of a radio wave transmitted by each image forming apparatus in each actual room, with an apparatus information about the image forming apparatuses in the layout information, and being stored, said inquiry request for address information including a reception electric field intensity for the image forming apparatus at an image-capturing point, and a direction of image-capturing by said photographing part that has been detected by the azimuth detection part provided in said mobile terminal, and to response to said inquiry request for address information, by said server, being referenced said server storage part and being identified an image forming apparatus which, in a location in said room layout that corresponds to said reception electric field intensity at said image-capturing point, when an azimuth corresponding to said image-capturing direction is viewed, is located in a direction of the azimuth, and address information about said identified image forming apparatus being transmitted to said mobile terminal.

4. The image forming system according to claim 1, wherein said job information, which has been transmitted from said image forming apparatus, is displayed in association with a location where the corresponding image forming apparatus is displayed in said display part of said mobile terminal.

5. The image forming system according to claim 1, wherein said job information includes existence/non-existence of printing job, a number of printing jobs, an expected execution termination time for all the printing jobs, and the details of each printing job.

6. The image forming system according to claim 1, wherein said server, when said image forming apparatus has not been identified, notifies said mobile terminal with an error message.

7. The image forming system according to claim 6, wherein said server, when said image forming apparatus has not been identified, notifies the mobile terminal with at least one message selected from:
a message for prompting of changing photographing object in order to identify image-captured image forming apparatus,
a message for prompting of photographing some other image forming apparatus having a different model information together with said image forming apparatus having not been identified, and
a message for prompting of collectively photographing all image forming apparatuses having the same model information.

* * * * *